United States Patent [19]

McGuigan et al.

[11] 3,882,043

[45] May 6, 1975

[54] ANTIOXIDANT COMPOSITION OF A REARRANGEMENT PRODUCT OF A TETRA-ARYL HYDRAZINE AND A THIAZINE OR AMINE

[75] Inventors: Brian McGuigan, Timperley; Richard John Dellar, Bolton; William David Phillips, Poynton, all of England

[73] Assignee: Ciba-Geigy Corporation, Ardsley, N.Y.

[22] Filed: Oct. 10, 1972

[21] Appl. No.: 296,452

[30] Foreign Application Priority Data
Oct. 16, 1971  United Kingdom........... 48239/71

[52] U.S. Cl.......... 252/402; 252/400 R; 252/400 A; 252/405; 252/406; 260/45.7 S; 260/45.9 R; 260/243 A
[51] Int. Cl................................................. B01j 1/16
[58] Field of Search........ 252/402, 406, 405, 400 R, 252/400 A; 260/243 A, 526, 569, 45.7 S, 45.9 R, 45.9 SC

[56] References Cited
UNITED STATES PATENTS

| | | | |
|---|---|---|---|
| 3,458,509 | 7/1969 | Levine | 252/402 |
| 3,489,749 | 1/1970 | Randell | 252/405 |
| 3,523,910 | 8/1970 | Randell | 252/402 |
| 3,536,706 | 10/1970 | Randell | 252/402 |
| 3,761,520 | 9/1973 | Napolitano | 260/243 A |

FOREIGN PATENTS OR APPLICATIONS

| | | |
|---|---|---|
| 1,224,653 | 3/1971 | United Kingdom |

*Primary Examiner*—Benjamin R. Padgett
*Assistant Examiner*—Irwin Gluck
*Attorney, Agent, or Firm*—Nestor W. Shust

[57] ABSTRACT

Antioxidant composition are prepared by thermally rearranging tetra-aryl hydrazines in the presence of a radical acceptor.

5 Claims, No Drawings

ANTIOXIDANT COMPOSITION OF A REARRANGEMENT PRODUCT OF A TETRA-ARYL HYDRAZINE AND A THIAZINE OR AMINE

The present invention relates to antioxidant compositions.

In the British Patent Specification No. 1,224,653, tetraaryl hydrazines having the formula

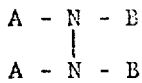

wherein A is an unsubstituted benzene or unsubstituted −α or β-linked-naphthalene nucleus or a phenyl nucleus substituted with one or more alkyl groups each containing from 4 to 9 carbon atoms and B is a phenyl group having one or more alkyl substituent groups each containing from 4 to 9 carbon atoms, are described. These compounds are prepared, for example by oxidation of a diarylamine A.NH.B. They are antioxidants, especially when incorporated into snythetic lubricants.

These tetra-aryl hydrazines may be converted by suitable processes into antioxidant compositions of even superior quality. Thus, in British Patent Specification No. 1,224,556 processes for producing antioxidant compositions which comprise oxidising at an elevated temperature, a compound having either the formula:

or the formula:

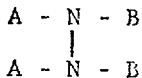

wherein A represents an unsubstituted phenyl α-naphthyl or β-naphthyl group, or a phenyl group having one or more tertiary alkyl group substituents containing from 4 to 9 carbon atoms or an α,α-dimethylbenzyl group are described. In this Specification is also described how the oxidation may advantageously be carried out in the presence of an alkali metal salt of a fatty acid or of an alkali metal salt of a phenol.

We have now discovered a further way in which excellent antioxidant compositions can be prepared.

According to the present invention there is provided a process for preparing an antioxidant composition which comprises thermally rearranging, by heating in a nonoxidising non-oxidising a compound of the formula:

in which A, B, C and D represent phenyl groups, phenyl groups substituted with one or more alkyl groups containing 1 to 12 carbon atoms or with one or more aralkyl or 1-alkyl cycloalkyl groups, in the presence of a radical acceptor. Compounds of the formula I include hydrazines where A, B, C and D are all different or where two or more of A, B, C and D are the same, e.g., where A and C are phenyl and B and D are substituted phenyl or where A and C and B and D are differently substituted phenyl groups.

Certain of the starting materials of formula I for our process are described in British Patent Specification No. 1,224,653. Compounds in which the phenyl groups bear substituents which are alkyl groups containing from 10 to 12 carbon atoms can be prepared in a strictly analogous manner to that described; the compound in which the phenyl group substituent is methyl can be prepared by heating p-toluidine and its hydrochloride at 140° - 200°C. under pressure (Wieland, Berichte 40, 4271), and the ethyl analogue can be prepared in similar manner. To prepare the hydrazine in which the substituents are isopropyl groups, 4,4' diisopropyl diphenylamine is produced by isopropylation of diphenylamine under similar but rather more severe conditions than those used for the preparation of 4,4' di-t-butyl diphenylamine, and the diphenylamine then oxidised. 4,4' di (α,α dimethyl benzyl) diphenylamine is commercially available (for example under the trade name Naugard 445) and may be oxidised to form the corresponding tetra-substituted hydrazine.

Highly effective antioxidant compositions are obtained when each substituent A, B, C and D is a phenyl group bearing at least one alkyl group substituent, and that preferably a tertiary alkyl group substituent, most preferably containing from 4 to 9 carbon atoms.

Specific examples of alkyl substituents on A, B, C and/or D are the t-butyl, t-octyl, nonyl and dodecanyl groups; excellent results are obtained when each A and B is a t-octyl phenyl group. A specific example of an aralkyl substituent on A, B, C and/or D is the α,α-dimethyl benzyl group. Examples of 1-alkyl cycloalkyl groups are 1-methyl cyclopentyl and 1-methyl cyclohexyl.

Thermal rearrangement according to this invention will suitably involve heating the hydrazine compound and the radical acceptor in an atmosphere of nitrogen for up to 48 hours. The temperature may be from 80° to 300°C., and temperatures from 120° to 180°C. have been found to be very satisfactory.

Examples of radical acceptors which may be used in the process according to the invention are phenothiazine, 3,7-disubstituted phenothiazines, 1,3,7-trisubstituted phenothiazines, N-hydrocarbyl-3,7-disubstituted phenothiazines in which the hydrocarbyl group is alkyl, aryl or aralkyl, N-phenyl-α- and N-phenyl-β-naphthylamines, o-, m- and p-phenylene diamines, iminodibenzyl, dibenzylamine and mono- and disubstituted phenyl naphthylamines, where the substituents as before are alkyl groups containing from 1 to 12 carbon atoms or are aralkyl or 1-alkyl cycloalkyl groups.

The relative proportions of the hydrazine compound and of the radical acceptor which must be heated together are not critical. In general, satisfactory results are obtained when the proportion of radical acceptor used is up to 2 moles per mole of the hydrazine. Used at low proportions, 0.25 : 1 or even up to 1 : 1, there is normally only a trace of free acceptor left in the final product, so that these lower proportions are preferred.

Examples of substrates which may be protected using antioxidants according to the invention are mineral oils, synthetic lubricants, rubber and plastics.

The antioxidants of the present invention may be used alone or in combination with other antioxidants, metal passivators, rust inhibitors, viscosity-index improvers, pour-point depressants, dispersants or detergents, extreme-pressure or anti-wear additives.

Examples of suitable other antioxidants which may be used in conjunction with the antioxidants of the present invention are compounds or mixtures of compounds selected from one or more of the following groups:

i. alkylated and non-alkylated aromatic amines and mixtures thereof
ii. hindered phenols
iii. alkyl, aryl or alkaryl phosphites
iv. esters of thiopropionic acid
v. salts of di-thio carbamic or dithiophosphoric acids Suitable amine compounds under sub-heading (i) are mono, di and tri tertiary alkyl diphenylamines such as dioctyldiphenylamine, mono and di tertiary alkylated α- and β- naphthylamines such as mono-t-octyl-α and -β- naphthylamines, mono, di and tri tertiary alkyl and aralkyl phenothiazines such as dioctyl phenothiazine, and phenyl-α- and β-naphthylamine; suitable hindered phenols under sub-heading (ii) are 2,6-di-tertiarybutyl-p-cresol, 4-4'-bis-(2,6-diisopropylphenol), 2,4,6-triisopropylphenol and 2,2'-thio-bis-(4-methyl-6-t-butylphenol); examples of phosphites under heading (iii) are triphenyl phosphite, trinonyl phosphite and diphenyldecylphosphite; a suitable ester of thiodipropionic acid is dilauryl thiodipropionate; examples of suitable salts under heading (v) are antimony diamyldithiocarbonate and zinc diamyldithiophosphate.

Examples of suitable metal passivators include those of the following types:

a. for copper; for example, benzotriazole 5,5'-methylene-bisbenzotriazole, 4,5,6,7-tetrahydrobenzotriazole, 2,5-dimercaptothiadiazole, salicylidene-propylene-diamine, salts of salicylaminoguanidine.
b. for magnesium; for example pyridylamines
c. for lead; for example quinizarin, propyl gallate, sebacic acid etc.

Rust inhibitors which may be employed in the lubricant compositions include those of the following groups:

a. Organic acids, for instance, sebacic acid and N-oleyl sarcosine and esters, metal salts and anhydrides of organic acids, for example, sorbitan mono-oleate, lead naphthenate and dodecenylsuccinic anhydride.
b. Nitrogen containing materials, for example:
   i. primary, secondary or tertiary aliphatic or cycloaliphatic amines and amine salts of organic and inorganic acids, for example morpholine, stearyl amine and triethanolamine caprylate.
   ii. heterocyclic compounds, for example imidazolines, and oxazolines.
c. Phosphorus containing materials, for example inorganic phosphates, phosphonic acids and amine phosphates.
d. Sulphur containing materials, for example barium dinonylnaphthalene sulphonates.

Suitable viscosity index improvers or pour-point depressants are, for instance, polyacrylates, polybutenes, polyvinyl pyrrolidones and polyethers.

Examples of dispersants or detergents include metal sulphonates especially calcium, barium and magnesium salts, metal phenates and polybutenyl succinimides.

Extreme pressure or antiwear additives appropriate for use in the lubricant composition include sulphur and/or phosphorus and/or halogen containing materials, for instance sulphurised oleate esters, tritolyl phosphate and chlorinated paraffins.

Other organic materials susceptible to oxidative degradation and for which the antioxidant compositions of the present invention are valuable antioxidants include, for instance, substances falling within the following groups:

a. materials consisting of, or based on, aliphatic or other hydrocarbons, for instance gasoline, lubricating oils, lubricating greases, mineral oils and waxes.
b. natural and snythetic polymeric materials, for instance, natural rubber; snythetic addition polymers such as homopolymers and co-polymers of vinyl and vinylidene monomers including ethylene, propylene, styrene, butadiene, acrylonitrile, vinyl chloride, vinyl acetate; synthetic polymers derived from condensation reactions and containing ether ester, amide or urethane groupings, for instance polyester, polyamide, polyurethane, polyalkylene glycol and polyarylene ether resins.
c. non-polymeric oxygen-containing substances for instance aldehydes such as n-heptaldehyde, and unsaturated fatty acids or ester thereof for instance ricinoleic acid and methyl oleate.
d. organo-metalloid substances such as silicone polymers, for instance polydimethylsiloxanes, polymethylphenyl-siloxanes and chlorinated derivatives thereof, silanes for instance tetra-alkyl and tetra-aryl silanes; and organo-metallic substances such as organo-metallic polymers.
e. vitamins, essential oils, ketones and ethers.

The invention will be illustrated by reference to the following Examples, all parts and proportions being by weight, unless otherwise stated.

EXAMPLE 1

39.3 parts of tetra (4-t-octylphenyl) hydrazine (prepared as described in British Patent Specification No. 1,224,653) were intimately mixed with 2.5 parts of phenothiazine and then heated at 180°C under nitrogen for 16 hours. A glassy dark green coloured solid remained on cooling, and thin layer chromatography indicated that it was a complex mixture containing 4,4'-di-t-octyldiphenylamine(ca 12%)trimers of 4,4'-di-t-octyl diphenylamine, and mixed dimers and trimers of 4,4'-di-t-octyl diphenylamine and phenothiazine and 2-(4,4'-di-t-octyldiphenylamine)-4,4'-di-t-octyldiphenylamine.

EXAMPLE 2

In a similar experiment to that described in Example 1, 39.3 parts of tetra (4-t-octylphenyl) hydrazine were heated at 180°C under nitrogen for 16 hours with 5 parts of phenothiazine. A tacky gum remained on cooling and thin layer chromatography indicated that it was a complex mixture containing phenothiazine (< 0.5%), 4,4'-di-t-octyldiphenylamine (ca 30%), and mixed dimers and trimers of 4,4'-di-t-octyldiphenylamine and phenothiazine.

EXAMPLE 3

In a similar experiment to that described in Example 1, 39.3 parts of tetra (4-t-octylphenyl) hydrazine were heated at 180°C under nitrogen for 16 hours with 10 parts of phenothiazine. A tacky gum remained on cooling and thin layer chromatography indicated that it was a complex mixture containing phenothiazine (4%), 4,4'-di-t-octyldiphenylamine (ca 50%), and mixed dimers and trimers of 4,4'-di-t-octyldiphenylamine and phenothiazine.

EXAMPLE 4

In a similar experiment to that described in Example 1, 39.3 parts of tetra (4-t-octylphenyl) hydrazine were heated at 180°C under nitrogen for 16 hours with 20 parts of phenothiazine. A tacky gum remained on cooling and thin layer chromatography indicated that it was a complex mixture containing phenothiazine (12%), 4,4'-di-t-octyldiphenylamine (ca 70%), and mixed dimers and trimers of 4,4'-di-t-octyldiphenylamine and phenothiazine.

EXAMPLE 5

39.3 parts of tetra (4-t-octylphenyl) hydrazine were intimately mixed with 5.3 parts of 3,7-di-t-octylphenothiazine and then heated at 180°C under nitrogen for 16 hours. A glassy brown solid melting at 50°–75°C remained, and thin layer chromatography indicated that it was a mixture of 4,4'-di-t-octyldiphenylamine, (ca 10%), 2-(4,4'-di-t-octyldiphenylamine -4,4'-di-t-octyldiphenylamine, trimers of 4,4'-di-t-octyldiphenylamine, and mixed dimers and trimers of 4,4'-di-t-octyldiphenylamine and 3,7-di-t-octylphenothiazine.

EXAMPLE 6

39.3 parts of tetra (4-t-octylphenyl) hydrazine were intimately mixed with 10.6 parts of 3,7-di-t-octylphenothiazine and then heated at 180°C under nitrogen for 16 hours. A glassy brown solid melting at 40°–70°C remained and thin layer chromatography indicated that it was a complex mixture of compounds.

EXAMPLE 7

In a similar experiment to that described in Example 5, 39.3 parts of tetra (4-t-octylphenyl) hydrazine were heated at 180°C under nitrogen for 16 hours with 21.2 parts of 3,7-di-t-octylphenothiazine. A tacky gum remained on cooling and thin layer chromatography indicated that it was a complex mixture.

EXAMPLE 8

In a similar experiment to that described in Example 5, 39.3 parts of tetra (4-t-octylphenyl) hydrazine were heated at 180°C under nitrogen for 16 hours with 42.4 parts of 3,7-di-t-octylphenothiazine. A tacky gum remained on cooling and thin layer chromatography indicated that it was a complex mixture of compounds.

EXAMPLE 9

39.3 parts of tetra (4-t-octylphenyl) hydrazine were mixed with 22.6 parts of dinonylphenothiazine and then heated at 180°C under a flow (15-20 ml./min.) of nitrogen for 24 hours. A tacky green-brown coloured gum (61.7 parts) remained on cooling and thin layer chromatography indicated that it was a complex mixture containing dinonyl phenothiazine (16%), 4,4'-di-t-octyldiphenylamine (ca 30%) and mixed dimers and trimers of 4,4'-di-t-octyldiphenylamine and dinonyl phenothiazine.

EXAMPLE 10

An intimate mixture of 39.2 parts of tetra (4-t-octylphenyl) hydrazine and 21.8 parts of 3,7-di ($\alpha,\alpha$-dimethylbenzyl) phenothiazine were heated at 180°C under a flow (15-20 ml./min.) of nitrogen for 16 hours. A glassy brown solid remained on cooling, and thin layer chromatography indicated that it was a complex mixture of 3,7-di ($\alpha,\alpha$-dimethyl benzyl) phenothiazine (0.5%), 4,4'-di-t-octyldiphenylamine (40%), and mixed dimers and trimers of 4,4'-di-t-octyldiphenylamine and 3,7-di ($\alpha,\alpha$-dimethylbenzyl) phenothiazine.

EXAMPLE 11

An intimate mixture of 39.2 parts of tetra (4-t-octylphenyl) hydrazine and 18.9 parts of 1,3,7-tri-t-butylphenothiazine were heated at 180°C under nitrogen for 16 hours. A glassy brown solid remained on cooling, and thin layer chromatography indicated that it was a mixture of 1,3,7-tri-t-butyl phenothiazine (5%), 4,4'-di-t-octyldiphenylamine, (ca 40%) and mixed dimers and trimers of 4,4'-di-t-octyldiphenylamine and 1,3,7-tri-t-butylphenothiazine.

EXAMPLE 12

39.2 parts tetra (4-t-octylphenyl) hydrazine were intimately mixed with 25.7 parts of N-benzyl-3,7-di-t-octyl phenothiazine and then heated at 180°C under a flow (15-20 ml./min.) of nitrogen for 24 hours. A pale green coloured glassy solid (64.8 parts) remained on cooling and thin layer chromatography indicated that it was a complex mixture.

EXAMPLE 13

56 parts tetra (4-t-butylphenyl hydrazine were intimately mixed with 42.3 parts of 3,7-di-t-octylphenothiazine and then heated at 180°C under a flow (15-20 ml./min.) of nitrogen for 16 hours. The brown glassy solid (98.3 parts) which remained on cooling was powdered and shown to have excellent antioxidant properties.

55 parts of the solid were dissolved in 500 parts by volume of diethyl ether, saturated with anhydrous hydrogen chloride, filtered to remove 27.6 parts of precipitated 4,4'-di-t-butyldiphenylamine hydrochloride whose identity was confirmed by comparison of its melting point and infrared spectrum with those of an authentic sample, and after evaporation of the filtrate gave 33.5 parts of brown coloured solid.

Separation of this product by preparative thin layer chromatography on silica eluted with a mixture of 70% carbon tetrachloride and 30% petroleum spirit boiling point 60°–80°C gave six fractions.

Fraction 1—15.5% was shown to be 3,7-di-t-octylphenothiazine.

Fraction 2—Mol. wt. 560 was identified as 2-(4,4'-di-t-butyl diphenylamino)-4,4'-di-t-butyldiphenylamine by comparison of its mass spectrum and nuclear magnetic resonance spectrum with those obtained from the authentic material.

Fraction 3—Mass spectrometry measurements indicate this fraction to be mainly a dimer of one molecular equivalent of 4,4'-di-t-butyldiphenylamine and one molecular equivalent of 3,7-di-t-octylphenothiazine, molecular weight 702 with a trace of a trimer of 4,4'-di-t-butyldiphenylamine, molecular weight 840.

Fraction 4—Mass spectrometry measurements indicate this fraction to have a molecular weight of 981 and to be a 'trimer' of two molecular equivalents of 4,4'-di-t-butyldiphenylamine and one molecular equivalent of 3,7-di-t-octylphenothiazine.

Fraction 5—Mass spectrometry measurements show this fraction to be 1-(3',7'-di-t-octyl)-10'-phenothiazinyl-3,7-di-t-octyl phenothiazine.

Fraction 6—Mass spectrometry measurements show this fraction to have a molecular weight of 1,266 and to contain t-octyl groups. The compound is believed to be a trimer of 3,7-di-t-octylphenothiazine and/or a tetramer of the phenothiazine and 4,4'-di-t-butyl diphenylamine.

EXAMPLE 14

80.8 parts tetra [4(α,α-dimethylbenzyl)] hydrazine were intimately mixed with 42.3 parts 3,7-di-t-octylphenothiazine and then heated at 180°C under a flow (15–20 ml./min.) of nitrogen for 17 hours. A tacky gum (122.4 parts) remained on cooling and thin layer chromatography indicated that it was a complex mixture.

EXAMPLE 15

28 parts tetra (4-t-butylphenyl) hydrazine were intimately mixed with 10.5 parts of 3,7-di-t-octylphenothiazine and then heated at 180°C under nitrogen for 16 hours. The brown glassy solid, 38.5 parts, which remained on cooling were dissolved in diethyl ether, saturated with dry hydrogen chloride and filtered to remove 8.6 parts of 4,4'-di-t-butyl diphenylamine hydrochloride. Upon evaporation of the filtrate 30 parts of purple coloured solid were obtained and shown by thin layer chromatography to be a complex mixture having the following elemental analysis:

Found: C, 82.84; H, 8.92; N, 4.40; S, 3.81%

EXAMPLE 16

39.3 parts of tetra (4-t-octylphenyl) hydrazine were intimately mixed with 2.74 parts of N-phenyl-2-naphthylamine and heated at 180°C for 16 hours under nitrogen. The glassy brown solid which remained on cooling was powdered; thin layer chromatography indicated that it was a complex mixture containing amongst others 20% 4,4'-di-t-octyldiphenylamine and less than 0.5% n-phenyl-2-naphthylamine.

EXAMPLE 17

39.2 parts of tetra (4-t-octylphenyl) hydrazine were intimately mixed with 16.6 parts of 4'-t-octyl-N-phenyl-2-naphthylamine and heated at 180°C for 24 hours under a flow (15–20 ml./min.) of nitrogen. The glassy brown fluorescent solid, 55.7 parts, which remained on cooling was powdered; thin layer chromatography indicated that it was a complex mixture containing amongst others 30% 4,4'-di-t-octyldiphenylamine and 1.5% 4'-t-octyl-N-phenyl-2-naphthylamine.

EXAMPLE 18

39.2 parts of tetra (4-t-octylphenyl) hydrazine were intimately mixed with 5.4 parts of phenylene-1,2-diamine and heated at 180°C for 16 hours under nitrogen. The tacky gum that remained on cooling was shown by thin layer chromatography to be a complex mixture containing amongst others 45% 4,4'-di-t-octyldiphenylamine and 1% phenylene-1,2-diamine.

EXAMPLE 19

84 parts of tetra (4-t-butyl phenyl) hydrazine were intimately mixed with 29.3 parts of iminodibenzyl and heated at 180°C for 24 hours under a flow (15–20 ml./min.) of nitrogen. A tacky gum that remained on cooling and thin layer chromatography indicated it to be a complex mixture containing amongst others 40% 4,4'-di-t-butyldiphenylamine and 20% iminodibenzyl.

EXAMPLE 20

84 parts of tetra (4-t-butyl phenyl) hydrazine were intimately mixed with 25.9 parts diphenylamine and heated at 180°C for 24 hours under a flow (15–20 ml./min.) of nitrogen. A glassy brown solid, 104 parts, remained on cooling and thin layer chromatography indicated it to be a complex mixture containing amongst others 45% 4,4'-di-t-butyldiphenylamine and 15% diphenylamine.

EXAMPLE 21

28 parts of tetra (4-t-butylphenyl) hydrazine were intimately mixed with 5.5 parts N-phenyl-2-naphthylamine and heated at 180°C under nitrogen for 24 hours. The glassy brown solid, 33.5 parts, which remained on cooling were dissolved in diethyl ether, saturated with dry hydrogen chloride, filtered to remove 9.9 parts of 4,4'-di-t-butyl diphenylamine. The ethereal filtrate was washed with water (2+100 parts) and evaporated to leave a glassy brown-purple coloured solid, 24.1 parts, shown by thin layer chromatography to be a complex mixture.

The resistance of synthetic lubricants to oxidation may be assessed by a modified Rolls Royce 1001 Oxidation Test. This test consists of passing moist air at 15 litres/hour through 50 ml. of the test fluid (with antioxidant) at a specified temperature for a specified period of time. At the end of the test duration the fluid lost by volatilisation is replaced by adding the required amount of test fluid. This is vigorously stirred into the oxidising fluid, and to promote complete homogeneity the mixture is re-heated to the test temperature and nitrogen is passed through for 30 minutes. At the end of this time the viscosity and acidity changes are determined.

EXAMPLES 22–42

Synthetic ester-based lubricant compositions were produced and subjected to a modified Rolls Royce 1001 Oxidation Test. The base fluid was a complex ester of sebacic acid, caprylic acid and trimethylolpropane in a nominal molar ratio of 1:28:10 as described and claimed in British Patent Specification No. 971,901.

To each sample of base fluid was added 2% by weight of additive and the tests were carried out at 215°C. The duration of each test was 3 days and the results are given in the table below.

The results in the table demonstrate the effectiveness of the products of the process of the present invention as lubricant antioxidants and their superior properties over conventional antioxidant compounds.

Table

| Example | Additive | | Viscosity % change | Final acid value mg.KOH/g | wt. loss % |
|---|---|---|---|---|---|
| | 4,4'-di-t-octyldiphenyl-amine | | 280 | 7.6 | 50 |
| | Phenothiazine | | 146 | 7.6 | 25 |
| | 3,7-di-t-octylphenothiazine | | 81 | 9.2 | 28 |
| | Rearrangement Product of tetra(4-t-octylphenyl) hydrazine in absence of a radical acceptor | | 167 | 7.5 | 39 |
| 22 | Product of Example | 1 | 46 | 6.6 | 15 |
| 23 | do. | 2 | 58 | 8.2 | 20 |
| 24 | do. | 3 | 22 | 3.0 | 13 |
| 25 | do. | 4 | 74 | 6.9 | 22 |
| 26 | do. | 5 | 93 | 9.5 | 28 |
| 27 | do. | 6 | 17 | 3.1 | 14 |
| 28 | do. | 7 | 17 | 2.7 | 15 |
| 29 | do. | 8 | 34 | 4.1 | 18 |
| 30 | do. | 9 | 24 | 4.8 | 16 |
| 31 | do. | 10 | 19 | 2.8 | 13 |
| 32 | do. | 11 | 13 | 1.7 | 12 |
| 33 | do. | 12 | 15 | 2.2 | 13 |
| 34 | do. | 13 | 21 | 3.2 | 14 |
| 35 | do. | 14 | 14 | 2.1 | 11 |
| 36 | do. | 15 | 122 | 8.5 | 26 |
| 37 | do. | 16 | 140 | 7.1 | 48 |
| 38 | do. | 17 | 170 | 6.8 | 45 |
| 39 | do. | 18 | 178 | 7.2 | 43 |
| 40 | do. | 19 | 166 | 6.2 | 43 |
| 41 | do. | 20 | 178 | 6.2 | 45 |
| 42 | do. | 21 | 40 | 5.3 | 15 |

We claim:

1. An antioxidant composition obtained by a process which comprises heating at a temperature of from 80°C to 300°C in a non-oxidising atmosphere, a compound of the formula

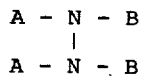

in which A and B represent a phenyl group or phenyl groups substituted with one or more alkyl groups containing 1 to 12 carbon atoms or phenyl groups substituted with one or more α,α-dimethyl benzyl groups, in the presence of a radical acceptor selected from thiazines and amines in the ratio of from 0.25:1 to 2:1 of the radical acceptor to the above compound.

2. An antioxidant composition obtained by a process as claimed in claim 1 in which A, B, C and D are each a phenyl group bearing a tertiary alkyl group having from 4 to 9 carbon atoms.

3. An antioxidant composition obtained by a process as claimed in claim 1 in which each A, B, C and D is a t-octyl-phenyl group.

4. An antioxidant composition obtained by a process as claimed in claim 1 in which the non-oxidising atmosphere is a nitrogen atmosphere.

5. An antioxidant composition obtained by a process as claimed in claim 1 in which the radical acceptor is selected from phenothiazine, 3,7-disubstituted phenothiazines, 1,3,7-trisubstituted phenothiazines, N-hydrocarbyl-3,7-disubstituted phenothiazines in which the hydrocarbyl group is alkyl, aryl or aralkyl, α-naphthylamine, N-phenyl-α-naphthylamine, N-phenyl-β-naphthylamine, o-, m- and p-phenylene diamines, iminodibenzyl, dibenzylamine, and mono- and disubstituted phenyl naphthylamines, the substituents being alkyl groups with 1 to 12 carbon atoms or aralkyl or 1-alkyl cycloalkyl groups.

* * * * *